April 16, 1968
R. H. BAUMAN
3,378,109
DISC BRAKE ASSEMBLY
Filed Aug. 29, 1966
4 Sheets-Sheet 3
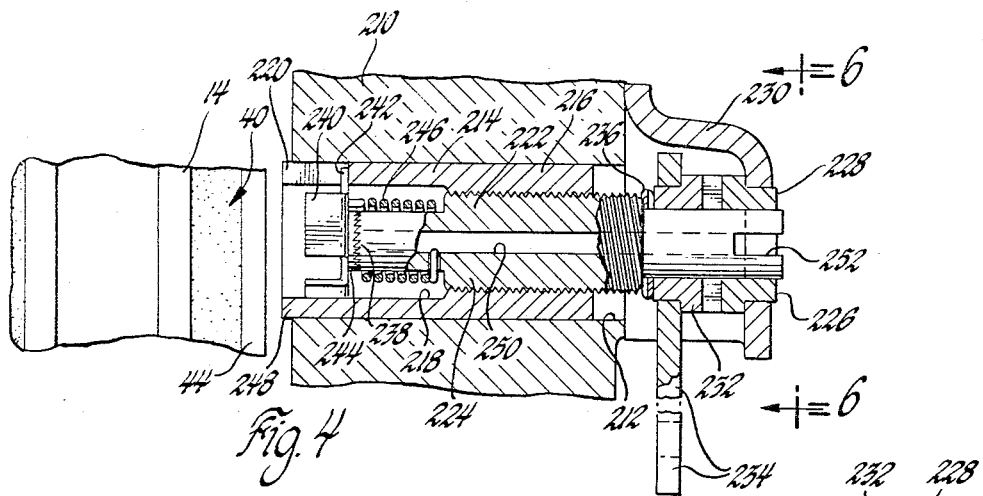
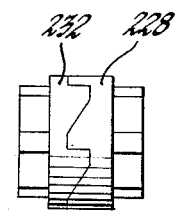
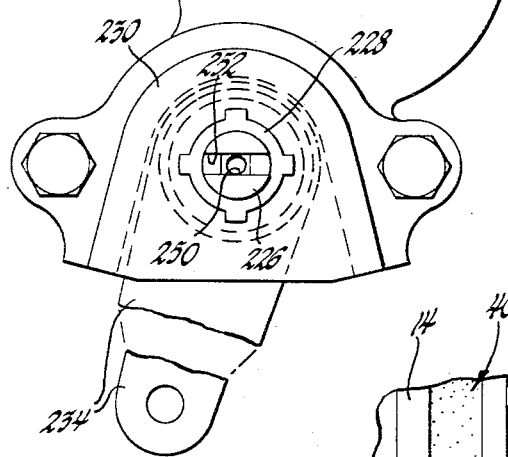
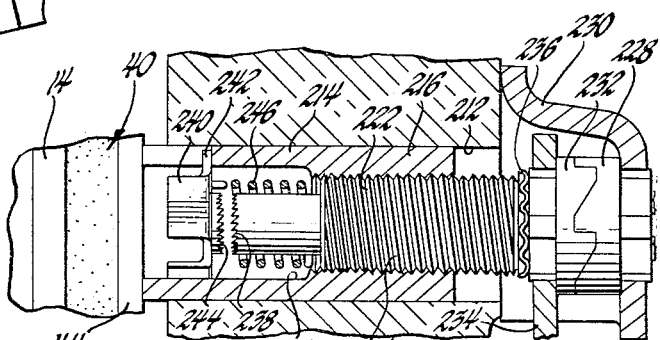
INVENTOR.
Robert H. Bauman
BY
D. D. McGraw
ATTORNEY INVENTOR.
Robert H. Bauman
BY
D. D. McGraw
ATTORNEY

United States Patent Office 3,378,109
Patented Apr. 16, 1968

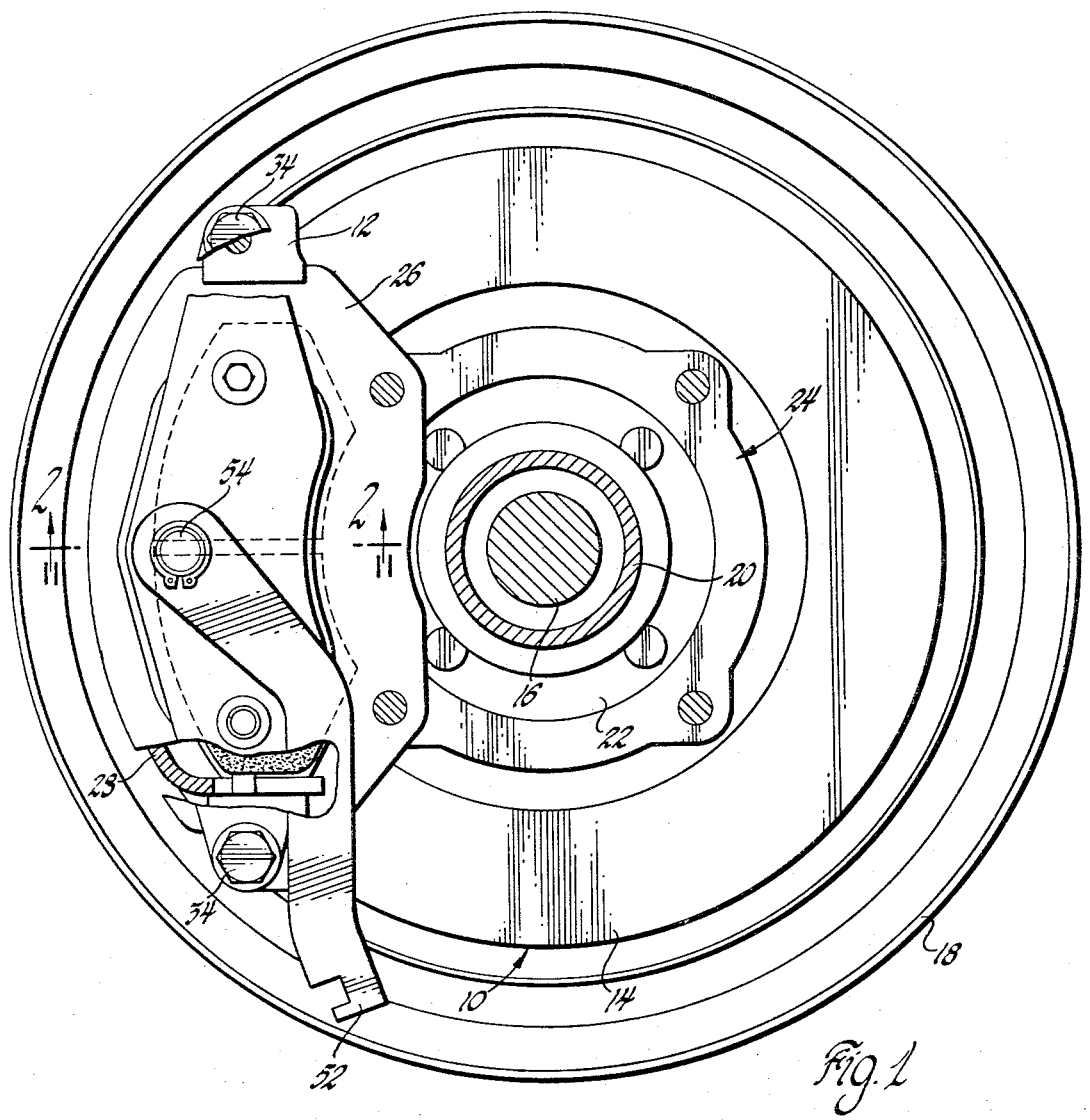

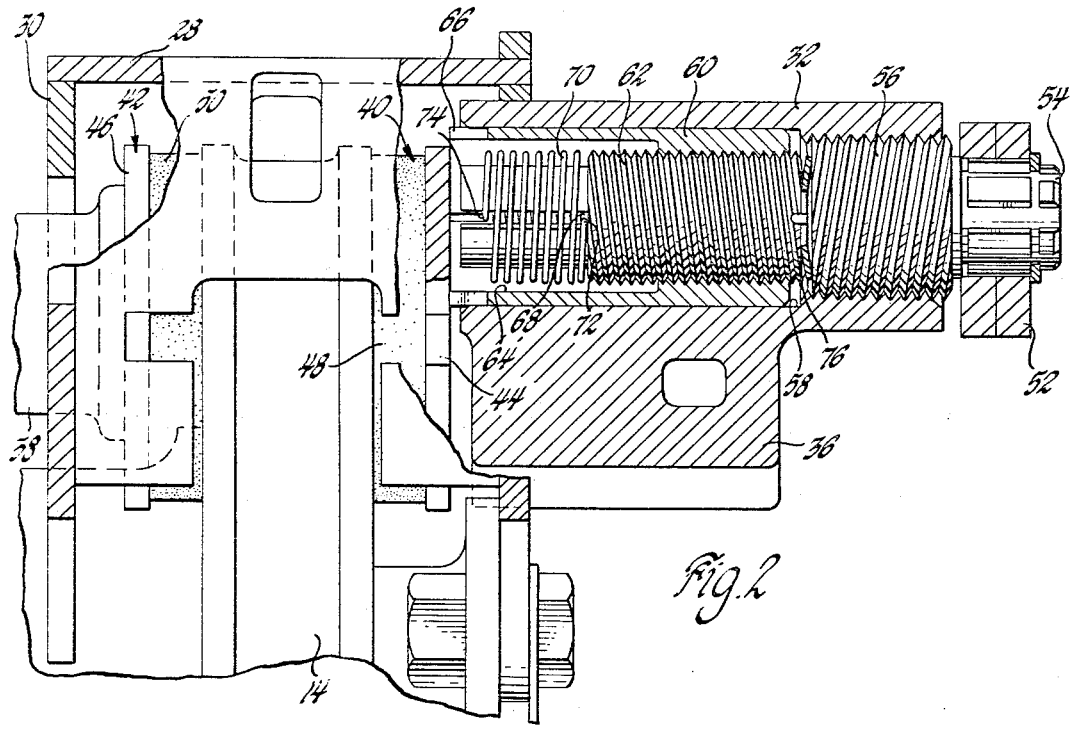
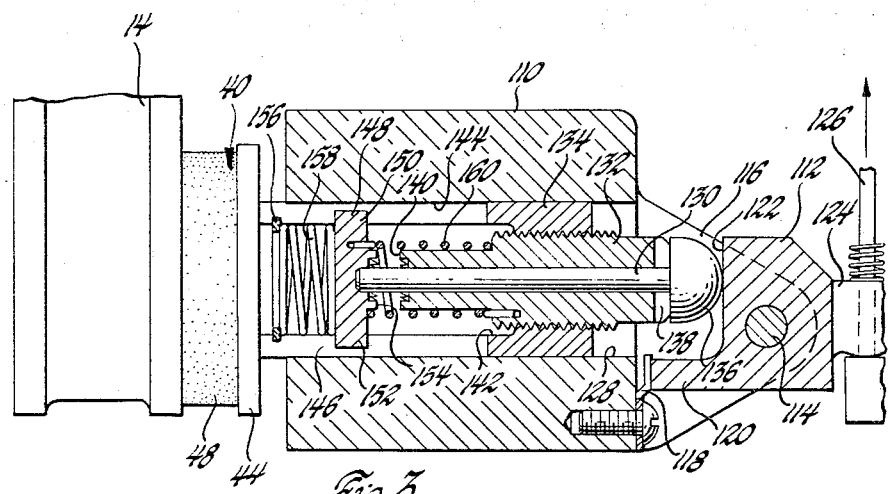

3,378,109
DISC BRAKE ASSEMBLY
Robert H. Bauman, Dayton, Ohio, assignor to General Motors Corporation, Detroit, Mich., a corporation of Delaware
Filed Aug. 29, 1966, Ser. No. 575,854
10 Claims. (Cl. 188—73)

ABSTRACT OF THE DISCLOSURE

The invention relates to a disc brake assembly and more particularly to one which includes a hand brake for applying the disc brake pads to the disc for parking and emergency purposes and means to automatically adjust the brake in response to brake pad wear.

Specification

When vehicles are equipped with front and rear disc brakes, the parking brake is usually provided either as an entirely separate unit or as a part of the rear wheel brake assemblies. The provision of separate parking brake units adds to vehicle cost and maintenance. The structures embodying the invention permit the combination of the rear disc service brake with mechanism for actuating the brake as a parking brake or as an emergency brake independent of the service brake actuating system. The mechanism also includes a brake shoe adjustment arrangement which maintains the shoes in close relationship to the disc so that little movement of the shoes is required to actuate the brake.

Each of the disclosed modifications provides for manual brake actuation through the arcuate or pivotal movement of a lever about an axis by suitable means such as a brake cable connected to a hand or foot actuated mechanism readily available to the vehicle operator. Means for translating the arcuate movement of the brake apply lever to brake pad assemblies includes automatically adjustable means. The brake assembly in which the various mechanisms may be located is illustrated as a sliding caliper arrangement wherein the brake actuating mechanism is on one side of the disc so as to move a brake pad assembly into engagement with the disc and move the caliper housing in the opposite direction so that a similar brake pad assembly on the other side of the disc is brought into frictional engagement with the disc. In a broad sense the disc brake assembly embodying the invention includes a disc and a brake pad assembly, a housing in which automatically adjustable brake shoe pad assembly applying means is located, the automatically adjustable means having a rotatable and axially movable member engaging the brake pad assembly and movable to force the brake pad assembly against the disc in braking relation, means associated with the housing and the rotatable and axially movable member to cause the member to move axially by rotatable movement of the associated means relative to the housing, and an adjustment mechanism including a torsion spring which operatively interconnects the rotatable and axially movable member and the associated means and urges them in relative rotation and consequent axial movement of the rotatable and axially movable member toward the disc so as to adjust the brake assembly for wear. In one embodiment the brake actuating lever is connected to a power screw which acts through a knockback spring to move a pin threaded into a sleeve, with one end of the sleeve engaging the brake pad assembly. The torsion spring interconnects the sleeve and the threaded pin so that relative rotational movement of these elements will cause axial displacement to maintain brake adjustment. Under some conditions of brake operation knockback of the brake pad assembly may occur. This most commonly occurs when severe cornering is encountered. The disc will force the brake pad assembly in a direction opposite to the brake applying direction. The provision of a knockback spring will permit slight movement of portions of the brake applying mechanism to allow brake pad assembly movement and will then move the brake pad assembly back to its original position when the disc side force no longer urges the brake pad assembly out of its normal position.

Other modifications of mechanism embodying the invention provide for pretensioning the torsion spring and holding it in position until, together with the sleeve and threaded pin, it is installed in the brake housing. An arrangement is then provided for releasing the torsion spring tension to provide the initial adjustment, while maintaining sufficient spring pre-load tension to provide further adjustment as brake shoe wear occurs. In one modification, the releasing mechanism is a headed pin which is installed in position through the threaded pin and operates as a cam follower for causing axial movement of the sleeve and threaded pin to apply the brake in response to a cam-like action of mechanism pivoted to the housing and moved by the brake cable. In other embodiments a pin or rod may be inserted through a passage extending through the threaded pin and actuated to release the lock holding the torsional spring in a pretensioned position. The pin or rod is then removed. In one embodiment a ramped cam arrangement is provided to translate arcuate movement of the brake apply lever to axial movement; in another a threaded arrangement provides such movement; in another the pivoted lever provides such movement by having a cam follower riding thereon; and in another embodiment the threaded arrangement of the pin in relation to the sleeve is itself utilized to move the sleeve in the brake pad assembly applying direction.

In the drawings:

FIGURE 1 is an elevation view of a vehicle rear wheel disc brake assembly embodying the invention, and having parts broken away and in section;

FIGURE 2 is a cross section view taken in the direction of arrows 2—2 of FIGURE 1, with parts broken away and in section;

FIGURE 3 is a view similar to FIGURE 2 illustrating a modified mechanism embodying the invention;

FIGURE 4 is a view similar to FIGURE 2 illustrating another modified mechanism embodying the invention;

FIGURE 5 is an elevation view of a portion of the mechanism of FIGURE 4;

FIGURE 6 is a side elevation of the mechanism of FIGURE 4 taken in the direction of arrows 6—6 of that figure;

FIGURE 7 is a view to FIGURE 4 and showing the mechanism in the released or adjusting position and in condition for brake operation;

Figure 8:
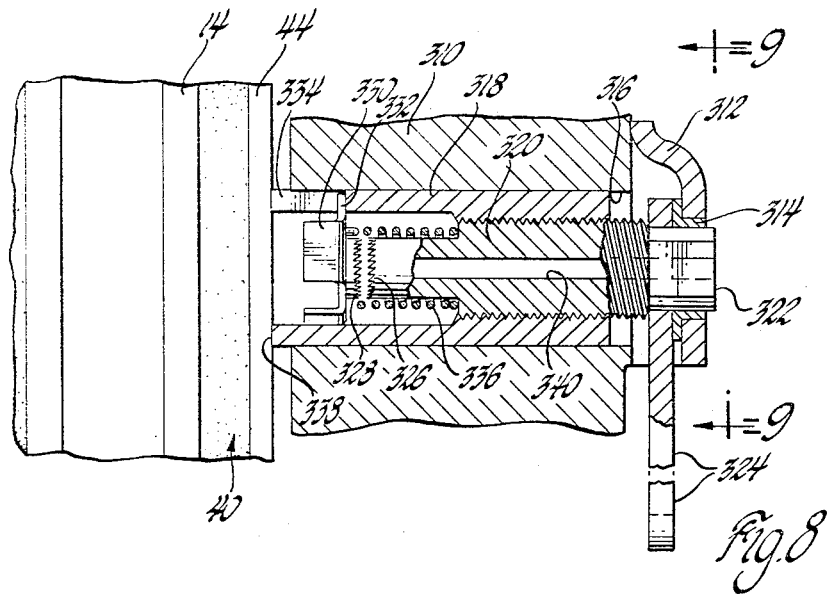
FIGURE 8 is a view similar to FIGURE 2 showing still another modification of mechanism embodying the invention.

The disc brake assembly 10 includes a caliper 12 and a disc 14. The brake assembly is illustrated as being provided for the rear wheel of a vehicle. Therefore, the axle 16 is connected to drive the wheel 18 for which the disc brake assembly is provided. The axle housing 20 has a flange 22 to which the caliper mounting bracket assembly 24 is attached. The mounting bracket assembly is illustrated as including three integrated parts. These are the flange connecting the bracket 26, and the brackets 28 and 30 which support the caliper slidable shoe and lining assembly. The caliper housing 32 is slidably mounted in the bracket 26 which forms the inner side wall of the mounting bracket assembly. A suitable aperture formed in bracket 26 is shaped to conform with the exterior cross sectional shape of caliper housing 32 for this purpose. The caliper housing 32 extends substantially chordally relative to the disc and has its outer ends receiving bolts or studs 34 which join the housing inner section 36 and the housing outer section 38 together. The inner and outer brake pad assemblies 40 and 42 include backing plates 44 and 46 having secured thereto suitable brake lining material 48 and 50. These pad assemblies are positioned in the caliper assembly between the caliper housing sections 36 and 38 and on opposite sides of disc 14 so that they are frictionally engageable with the disc friction surfaces. The brake pad assemblies 40 and 42 have their ends in abutting relation to bracket 28 of the mounting bracket assembly 24 so that the brake torque is taken directly on the mounting bracket and transferred to the axle housing. The caliper housing section 36 has suitable hydraulically actuated piston means formed therein and engaging brake pad assembly 40 so that when the piston or pistons are pressurized that shoe assembly moves into braking engagement with the disc 14 and the reaction forces transferred through the caliper housing 32 move the brake pad assembly 42 into braking engagement with the other side of the disc 14. The caliper housing 32 is permitted to slide relative to the mounting bracket assembly 24 to permit this action and also to adjust for brake lining wear.

The caliper 12 is also equipped with a manual emergency and parking brake arrangement which incorporates an adjusting mechanism for maintaining the brake shoes in the desired adjusted position in relation to the disc 14. The construction of this portion of the caliper is best seen in FIGURE 2. The mechanism associated with the caliper for manual operation includes the lever 52 which is suitably connected to be moved arcuately by a hand lever or other manually operated mechanism to apply the brake as an emergency or parking brake. The lever 52 is non-rotatably connected to the outer end 54 of the power screw 56. The power screw 56 is threaded into the housing 32 by the provision of suitable mating threads. For reasons to be described, these threads may by way of example be left hand threads. A bore 58, the outer end of which has threads engaging power screw 56, is formed in housing 32 and has a sleeve 60 reciprocably received therein. Before the mechanism is installed in the housing 32, a threaded pin 62 is threaded into sleeve 60. The threads of sleeve 60 and pin 62 are of the opposite hand from the threads of power screw 56, and by way of example are right hand threads. The threads of sleeve 60 and pin 62 also have a different lead, the pin and sleeve threads having a smaller lead than the power screw threads. The sleeve 60 also has a bore 64 extending therethrough, the outer end of which has the threads formed therein which engage the threads of pin 62, and the remainder thereof being somewhat enlarged in diameter and extending through the bore 58 and into engagement with the backing plate 44 of the brake pad assembly 40. The end of the sleeve engaging the backing plate has notches 66 provided therein. The end of pin 62 in the enlarged portion of bore 64 has an axially extending slot 68 extending through an unthreaded portion of the pin of slightly smaller diameter than the threaded portion. A torsion spring 70 has several coils extending about the slotted portion of pin 62, with one spring end 72 extending into the slot 68 and the other spring end 74 extending into one of the sleeve notches 66. Before installing the mechanism in the caliper housing 32, the pin 62 is threaded into the sleeve 60 and the torsion spring 70 has its ends respectively installed in the pin slot and a sleeve notch. The pin is then threaded further into the sleeve to a sufficient depth, and a retaining pin is inserted diametrically through to notches 66 and slot 68 to prevent the pin 62 from unwinding in sleeve 60 until after the pin and sleeve unit is installed and the retaining pin is withdrawn. The pin and sleeve unit is inserted in the caliper housing, and the power screw 56 is screwed into position. A suitable knockback spring 76 is positioned on one end of power screw 56 and is illustrated as being a spring washer. Spring 76 also engages one end of pin 62. After the installation is made in this manner, the retaining pin is removed from the notches 66 and slot 68 and torsion spring 70 causes the pin 62 to rotate in the sleeve 60 so that the pin and sleeve threads force the notched end of the sleeve into contact with the shoe backing plate 44.

As the hand operated lever 52 is rotated counterclockwise as seen in FIGURE 1, it causes the power screw 56 to advance toward the disc 14. This will flatten the knockback spring 76 and further movement then causes force to be exerted on pin 62 which is transmitted through sleeve 60 to the brake pad assembly 40, causing the brake pad to engage the disc and braking action to take place. As the brake lining 48 wears, sleeve 60 and pin 62 will be relatively rotated by torsion spring 70 to maintain contact of the sleeve end with the brake pad assembly 40. The load of the knockback spring 76 is sufficient to overcome torsion spring 70 and maintain a designed clearance between the power screw 56 and the pin 62. Thus, when the vehicle is turning a corner and the brake pad assembly 40 is forced in a retracting direction, there is room for the pin 62 and sleeve 60 to move slightly outward but to return to their original position after the cornering action is completed.

FIGURE 3 illustrates a modification of the structure of FIGURE 2. The modified structure may be utilized in the same environment wherein the disc 14 and the mounting bracket assembly 24 provide a mounting for the slidable caliper housing. Due to certain construction features of the modified structure the caliper housing 110, while similar to the housing 32, is modified in the area particularly illustrated in FIGURE 3. The mechanism of FIGURE 3 includes a lever 112 pivotally mounted on a pin 114 extending through ears 116 formed on housing 110. Lever 112 is supported by the knockback spring 118, which is a cantilever type spring secured to the housing 110. The lever 112 has an arm 120 which extends to engage spring 118. The main body of the lever also has a flat cam surface 122. The lever has another arm 124 to which is connected the brake actuating cable 126. This cable is pulled in the direction of the cable arrow toward the front of the vehicle to manually apply the brake.

Housing 110 has a bore 128 extending therethrough between the ears 116 and in which the adjusting mechanism is received. The adjusting mechanism includes a release pin 130 contained in a threaded pin 132 which is threaded into the sleeve 134, which is installed in bore 128 of the housing 110. The pin 132 has a passage extending axially therethrough through which the release pin 130 extends. The enlarged head 136 of the pin 130 engages the cam surface 122 of lever 112. The outer end of pin 132 has a cross slot 138 provided to receive a screwdriver for use during assembly of the mechanism. The inner end of pin 132 has a decreased cross section area and terminates in axially extending clutch teeth 140.

The sleeve 134 is constructed generally similar to sleeve 60 of FIGURE 2. The outer portion of sleeve 134 is internally threaded to receive pin 132 and the remainder of the sleeve has an enlarged bore 142 which is provided with axially extending slots 144 and 146. A detent 148 is provided with ears 150 and 152 so that the detent is slidable within the sleeve bore 142 and the ears are respectively contained in slots 144 and 146 to prevent the detent from rotating. The center of the detent is recessed to receive the inner end of the release pin 130. Axially extending clutch teeth 154 are provided on the detent 148 so that they are engageable with the clutch teeth 140 of pin 132. A snap ring 156 retains a compression spring in the inner end of sleeve 134 so that the spring urges the detent 148 toward the pin 132. A torsion spring 160 is positioned about the reduced cross section portion of pin 132 with one end of the torsion spring being secured to the detent 148 and the other end secured to the pin 132. The inner end of sleeve 134 engages the backing plate 44 of the brake pad assembly 40, which is positioned for frictional engagement with the disc 14 in the same manner as illustrated and described with regard to the structure of FIGURE 2. It is obvious that another brake pad assembly is positioned on the other side of the disc and that the remainder of housing 110 is constructed in the same manner as is housing 32.

Prior to assembly of the mechanism the pin 132 is rotated into the sleeve 134 by the use of a screwdriver inserted in the slot 138. In this free state, since release pin 130 has not yet been installed, the teeth 154 of detent 148 have been forced into contact with the teeth 140 on the end of pin 132 by compression spring 158. As the pin 132 is turned clockwise, detent 148 is moved axially back and forth by camming action of the teeth 140 and 154 and the force of spring 158, preventing reverse rotation of pin 132. The teeth 140 and 154 are so constructed as to permit this slipping action in one direction but not in the other. The sleeve and pin assembly is then inserted into the housing 110. The release pin 130 is then loosely inserted into pin 132. Lever 112 is then installed and pushes the release pin 130 to the left which in turn forces the detent 148 to the left, disengaging the teeth 154 from the teeth 140, allowing pin 132 to rotate until the sleeve 34 is moved sufficiently far to the left to be forced against the brake pad assembly 40. As the brake lining 48 wears, a torsion spring 160 will cause further relative rotation of pin 132 and sleeve 134, thereby maintaining the inner end of sleeve 134 against the brake pad assembly. The knockback spring 118 is sufficiently strong to overcome the resultant axial load of the torsion spring 160. Spring 118 is utilized only when the vehicle is cornering or when for some other reason the disc 14 causes movement of the unit to the right.

The brake system is manually actuated by exerting a pulling force on the brake cable in the direction of the arrow, causing rotation of the lever 112 and thereby applying force to the sleeve and pin assembly. This in turn transmits force to the brake shoe assembly to apply the brakes. Detent 148 is used to wind or rewind the mechanism and acts as an anti-rotational device until assembled. Its only other function is to transmit the torsional force of spring 160 between the sleeve 134 and the pin 132.

FIGURES 4–7 illustrate another modification of the mechanism of FIGURES 1 and 2. This modification is quite similar to that of FIGURE 3, with certain elements thereof being simplified. The general construction and arrangement of the disc brake assembly is the same as that of FIGURES 1 and 2, so therefore only the portions directly affected by the modification are illustrated. The housing 210 is constructed in the same general manner as housing 32 for application of the brake. The housing bore 212 slidably receives a pin and sleeve assembly. The sleeve 214 has one internally threaded end 216 with the other end thereof being provided with an enlarged bore 218. A longitudinally extending slot 200 is provided at the inner end of the sleeve 214. The pin 222 has a central section 224 externally threaded to mate with the internal threaded end 216 of the sleeve 214. The outer end 226 of pin 222 has a reduced cross section area. This end is substantially circular but is provided with one or more flats. End 226 is rotatably received in a fixed cam and bearing element 228 which is secured to housing 210 by a fixed bracket 230. Element 228 is in axial alignment with the bore 212 of the housing and is spaced therefrom. A mating cam element 32 is received on the pin end 226 and is provided with a mating flat or flats so that it is rotatably fixed relative to the pin. As can be seen in FIGURE 5, the cam construction permits rotation of element 232 in one direction relative to element 228, which will also cause axial movement of element 232 to the left. A brake apply lever 234 is splined to cam element 232 so that the cam element may be rotated, causing rotation and axial movement of pin 222. A wavy washer type of knockback spring 236 is provided between element 232 and the shoulder formed by the central section 224 of pin 222. The left or inner end of pin 222 has a reduced cross section area and terminates in ramped one-way clutch teeth 238. A detent or retainer element 240 is slidably received in bore 218 on the sleeve 214 and has an ear 242 extending into slot 220 to prevent rotation of the detent relative to the sleeve. The detent is provided with mating ramped one-way clutch teeth 244 which are engageable with the teeth 238 of pin 222. A torsion and extension spring 246 extends about the inner end of pin 222 and has one end secured to the pin and the other end secured to the detent 240. The inner end 248 of sleeve 214 is engageable with the disc brake pad assembly 40 which in turn can be applied to brake the disc 14. Pin 214 is provided with a through passage 250, with the outer end of the pin being cross slotted at 252.

Prior to assembly of the mechanism, pin 222 is threaded into sleeve 214 with detent 240 being prevented from rotation by ear 242 and slot 220. Thus spring 246 is torsionally tensioned with teeth 238 and 244 engaged, as in the manner of FIGURE 3. The assembly is then inserted in the housing so that the outer end 226 of pin 222 extends through the cam elements 228 and 232. The assembly of the brake is then completed, after which a rod is inserted through a pin passage 250 to move detent 240 to the left and thereby release the torsional force stored in spring 246. This force then causes the sleeve 214 and pin 222 to be relatively rotated until the sleeve end 248 engages the brake pad assembly 40. When the apply lever 234 is rotated so as to cause element 232 to be cammed leftwardly from cam element 228, the pin 222 and the sleeve 214 are moved leftwardly to apply the brake. As brake lining wear takes place, spring 246 further relatively rotates sleeve 214 and pin 22 to maintain brake adjustment. The assembly is shown in the installed and operative position in FIGURES 6 and 7.

Figure 9:
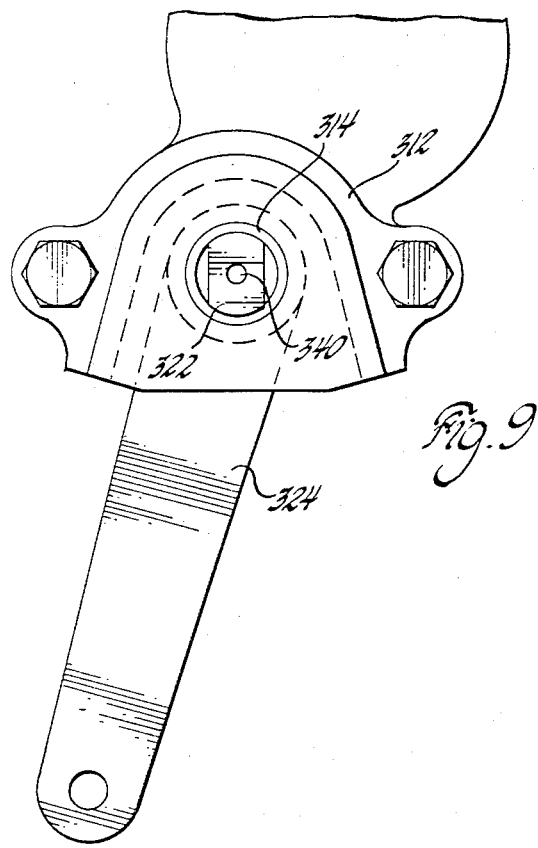
FIGURE 9 is a view similar to FIGURE 6 and taken in the direction of arrows 9—9 of FIGURE 8.

FIGURES 8 and 9 show another modification of the assembly of FIGURES 1 and 2. This modification is similar to that of FIGURES 4–7 but is further simplified. The housing 310 has a bracket 312 secured thereto which contains a bushing 314 in axial alignment with the bore 316 formed in the housing. The sleeve 318 is slidably received in the bore and the pin 320 is threadedly received in the sleeve. The outer end 322 of pin 320 is circular so as to rotate within the bushing 314 and is provided with one or more flats, illustrated here as two opposed flats, so the apply lever 324 may be attached to the pin and rotated. The inner end of the pin 320 has ramped one-way clutch teeth 326 which are engageable with similar teeth 328 on a detent member 330 received in the inner end of sleeve 318. The detent 330 is prevented from rotating by an ear 332 extending into a slot 334 formed in sleeve 318 in the same manner as the detent of FIGURES 4–7. A torsion spring 336 is connected to the detent 330 and the pin 320 as is spring 246 of FIGURE 4. The end 338 of the sleeve 318 is engageable with the brake pad assembly 40 for disc 14. The pin 320 is provided with a through passage 340.

The unit is assembled in a manner similar to that of FIGURES 4–7. When the apply lever 324 is rotated by pulling on a suitable brake cable, the pin 320 tends to be screwed out of the sleeve 318. Since, however, the pin is prevented from moving axially outwardly by bushing 314, apply lever 324, and the shoulder formed by the reduced diameter section 322, sleeve 318 is forced inwardly to move the brake shoe assembly 40 into engagement with the disc 14. The torsional force of spring 336 tends to aid this movement. It also tends to resist return movement of the sleeve 318 when the apply lever 324 is moved to the release position. When it is wound a sufficient amount, it will cause relative rotation of sleeve 318 about pin 320 to move the sleeve inwardly toward the disc 14 and maintain adjustment.

What is claimed is:

1. The disc brake assembly having a disc and a brake pad assembly and automatically adjustable means for selectively applying said brake pad assembly to said disc in braking relation, said adjustable applying means comprising a housing, a member rotatably and axially movable in said housing and engaging said brake pad assembly, means associated with said housing and said member causing said member to move axially upon rotatable movement of said associated means relative to said housing, said rotatably and axially movable member and said associated means having connection means therebetween causing relative axial movement of said member and said associated means upon relative rotatable movement therebetween, and a torsion spring operatively interconnecting said rotatably and axially movable member and said associated means and urging them in relative rotation and consequent axial movement of said member toward said disc to adjust the brake assembly for wear.

2. The brake assembly of claim 1, said associated means including a power screw threaded into said housing and a pin threaded into said rotatably and axially movable member with a thread opposite to that of said power screw, and means for rotating said power screw to move said pin and said member axially to apply the brake, said torsion spring interconnecting said member and said pin and continually urging said member axially toward said brake pad assembly by relative rotation of said member and said pin.

3. The disc brake assembly of claim 1, said associated means including a pin threaded into said rotatable and axially movable member having a thread lead of one hand and a power screw axially operatively engaging said threaded pin and threaded into said housing with a thread lead of the opposite hand and a greater pitch than the threads of said pin and said member, a lever secured to said power screw for rotating said screw to move said threaded pin and member axially, and a knockback spring between said threaded pin and said power screw, said torsion spring interconnecting said member and said threaded pin.

4. The disc brake assembly of claim 1, said adjustable applying means further comprising a detent slidably and non-rotatably mounted in said rotatable and axially movable member and serving to connect said torsion spring and said rotatable and axially movable member, said detent and said associated means having mating ramped one-way clutch teeth selectively holding said spring in tension preventing relative rotational movement of said rotatable and axially movable member and said associated means.

5. The disc brake assembly of claim 4 further comprising a pin at least selectively extending through said associated means and engaging said detent and movable axially to disengage said teeth and permit said spring to relatively rotate said member and said associated means to adjust said brake assembly.

6. The disc brake assembly of claim 5, said pin having a head on the end thereof opposite said detent, said pin head abutting said associated means, and said housing having a lever pivotally mounted thereon and in axial force transmitting relation with said pin upon pivotal movement thereof to actuate said brake assembly.

7. The disc brake assembly of claim 5, further including a lever pivotally mounted on said housing and means translating arcuate pivotal movement of said lever into axial movement of said associated means.

8. The disc brake assembly of claim 7, further including a knockback spring operatively intermediate said associated means and said lever and permitting limited movement of said brake pad assembly and said member and said associated means when knockback occurs while the brake assembly is released and returning said brake pad assembly and said member and said associated means to the adjusted position after knockback.

9. The disc brake assembly of claim 7, said translating means comprising a ramped cam fixed on said housing and a mating ramped cam on said lever and engaging said associated means in axial force exerting relation.

10. The disc brake assembly of claim 7, said translating means being mating threads formed on said rotatable and axially movable member and on said associated means, said lever being non-rotatably secured to said associated means and said associated means being rotatably mounted in said housing and restricted against axial movement in axial direction away from said brake pad assembly.

References Cited
UNITED STATES PATENTS

| | | | |
|---|---|---|---|
| 3,110,364 | 11/1963 | Butler | 188—73 |
| 3,158,234 | 11/1964 | Henderson | 188—196 |

FOREIGN PATENTS

| | | |
|---|---|---|
| 934,081 | 8/1963 | Great Britain. |

MILTON BUCHLER, *Primary Examiner.*

G. E. HALVOSA, *Assistant Examiner.*

UNITED STATES PATENT OFFICE
CERTIFICATE OF CORRECTION

Patent No. 3,378,109                          April 16, 1968

Robert H. Bauman

It is certified that error appears in the above identified patent and that said Letters Patent are hereby corrected as shown below:

Column 1, line 39, after "to" insert -- brake apply movement of the --. Column 2, line 54, after "view" insert -- similar --. Column 5, line 32, "34" should read -- 134 --; line 64, "200" should read -- 220 --; line 75, "32" should read -- 232 --.

Signed and sealed this 2nd day of September 1969.

(SEAL)
Attest:

Edward M. Fletcher, Jr.                    WILLIAM E. SCHUYLER, JR.
Attesting Officer                            Commissioner of Patents